Figure 1:
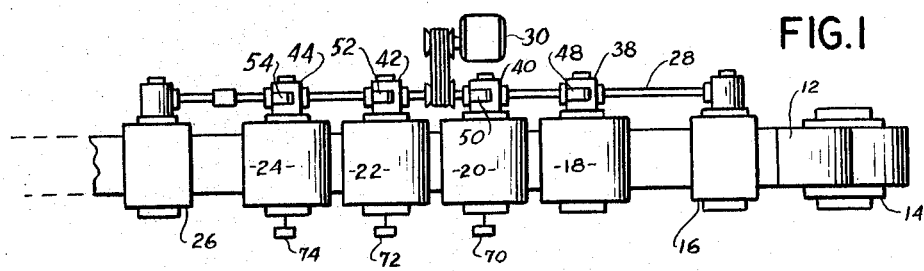

Aug. 9, 1966  C. A. LEWIS ET AL  3,264,983
REGISTRATION SYSTEM FOR A MOVING WEB

Filed Feb. 18, 1964  4 Sheets-Sheet 1

INVENTORS
CLARENCE A. LEWIS
JAMES F. O'BRIEN
BY
*James and Franklin*
ATTORNEYS

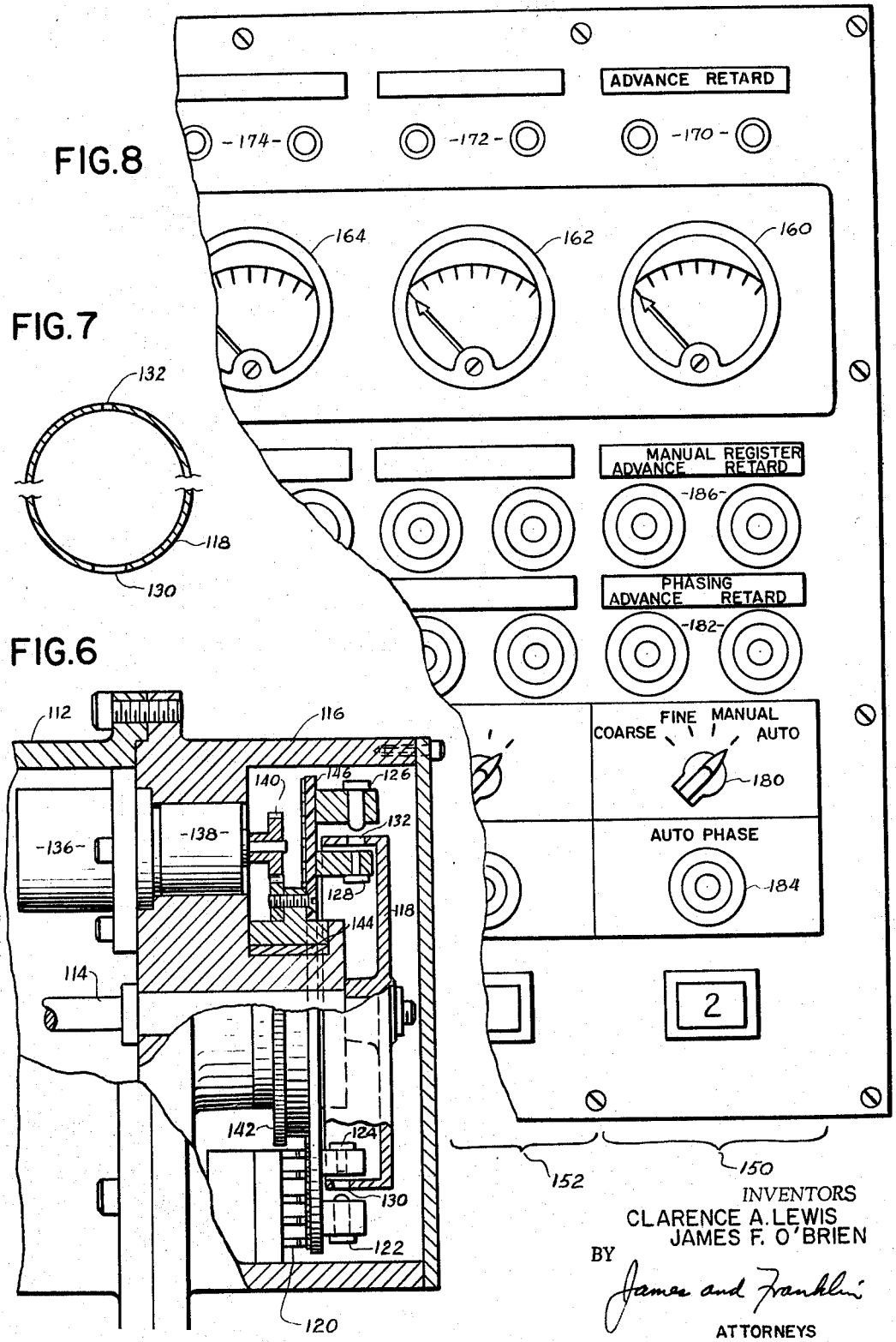

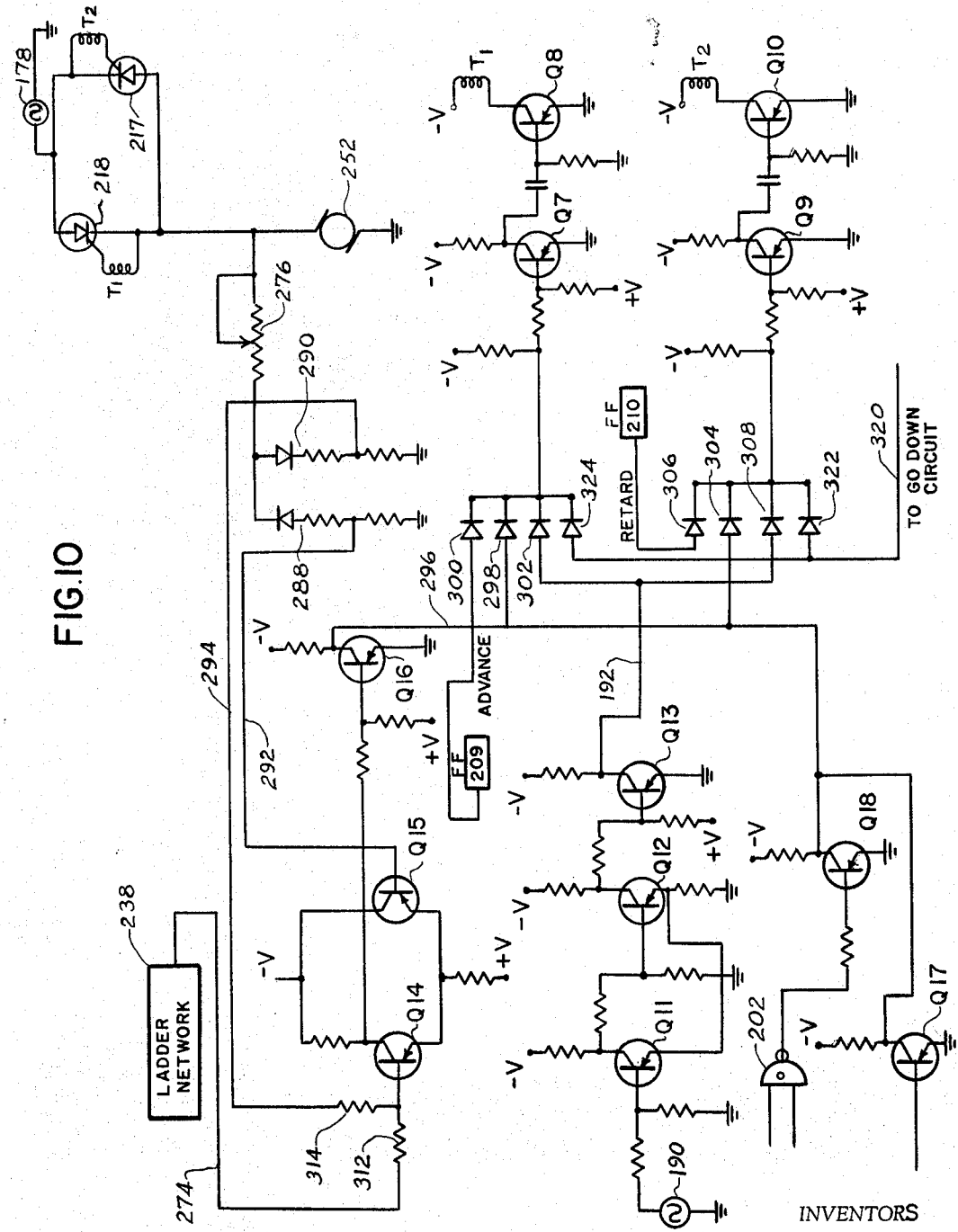

United States Patent Office 3,264,983
Patented August 9, 1966

3,264,983
REGISTRATION SYSTEM FOR A MOVING WEB
Clarence A. Lewis, Kinnelon, and James F. O'Brien, Sussex, N.J., assignors to Champlain Company, Inc., Roseland, N.J., a corporation of New York
Filed Feb. 18, 1964, Ser. No. 345,784
17 Claims. (Cl. 101—181)

This invention relates to registration systems for operations to be performed on a moving web, typically for multicolor printing. The general object of the invention is to improve such registration systems.

Electronic register controls are either analog or digital, and involve both measurement of error and correction of error. The analog method for measuring the error is limited in accuracy, but is better suited for correction, because the physical changes to be corrected are continuous and gradual in nature. Digital methods of measuring the error are more accurate, but digital correction schemes do not provide the desired stability, because they are discontinuous and abrupt in nature. Backlash and inertia in mechanical machine connections cause stability problems when digital correction is utilized.

One object of the present invention is to overcome the foregoing difficulties. Another object is to combine the advantages of both the analog and digital systems, while eliminating their disadvantages. To oversimplify, the new system combines digital measurement of error with analog correction of the error.

The error is measured digitally by generating a pulse pair and counting high-frequency pulses for the duration of the pulse pair. The error is first stored in a binary counter, and then converted to an analog voltage, which is utilized to drive an electromechanical device in such a way that the rate of correction is proportional to the magnitude of the error. Thus, as the error decreases, the rate of correction decreases, until finally at zero error the rate of correction is zero. Momentum of the mechanical parts is reduced long before zero register error is reached, resulting in no "overshoot," and instead providing a critically damped operation.

Heretofore, much work has been directed toward the operation of the computer used in the system. Various types of compensation have proved necessary to make the control successful. In effect, these compensating networks operate on the error signal in an effort to produce stable operation. They are necessary because the controls include a highly responsive correction device. Hydraulic power devices, whether solenoid-operated "on-off," or proportional servo-valve controlled, have little inertia and are therefore extremely responsive. This is desirable in many applications, but it is undesirable in a sampled data control system such as the present register control, because there is no smoothing of the sampled error inputs, and no filtering of the random errors. There is full correction even for random errors, which aggravates the register problem.

Another object of the present invention therefore is to overcome this difficulty, and to provide an improved system in which the correction device smooths the correction result and which also filters any random errors.

Figure 2:
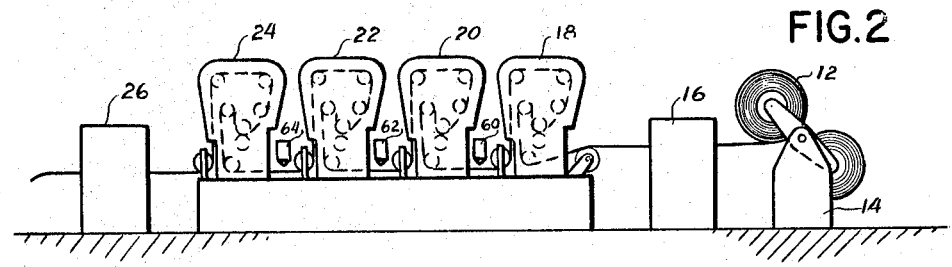
Figure 3:
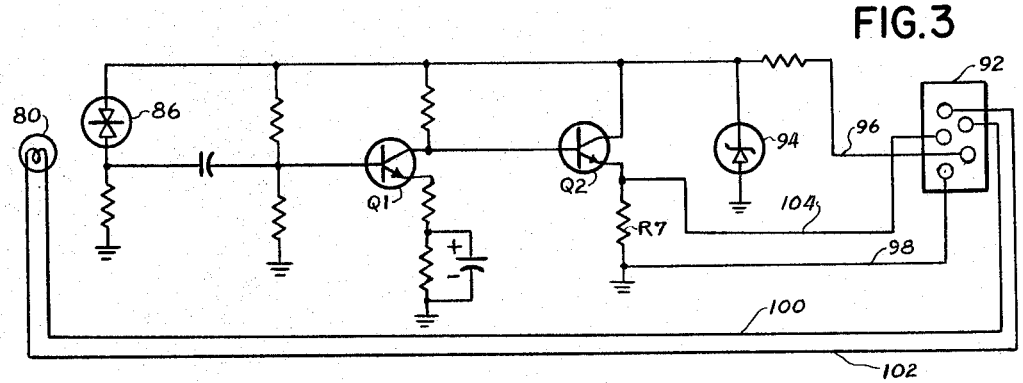
Figure 5:
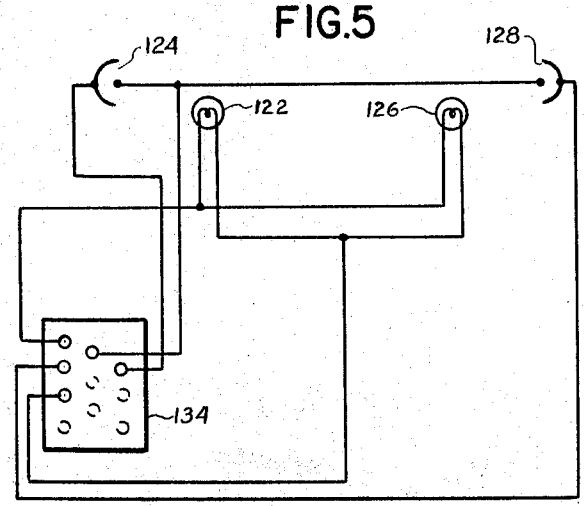
Figure 4:
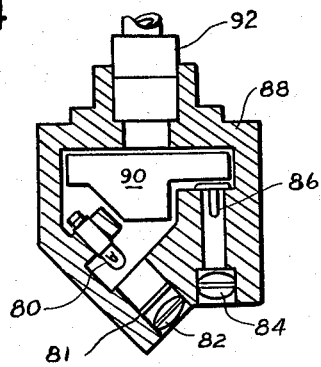
Figure 9:
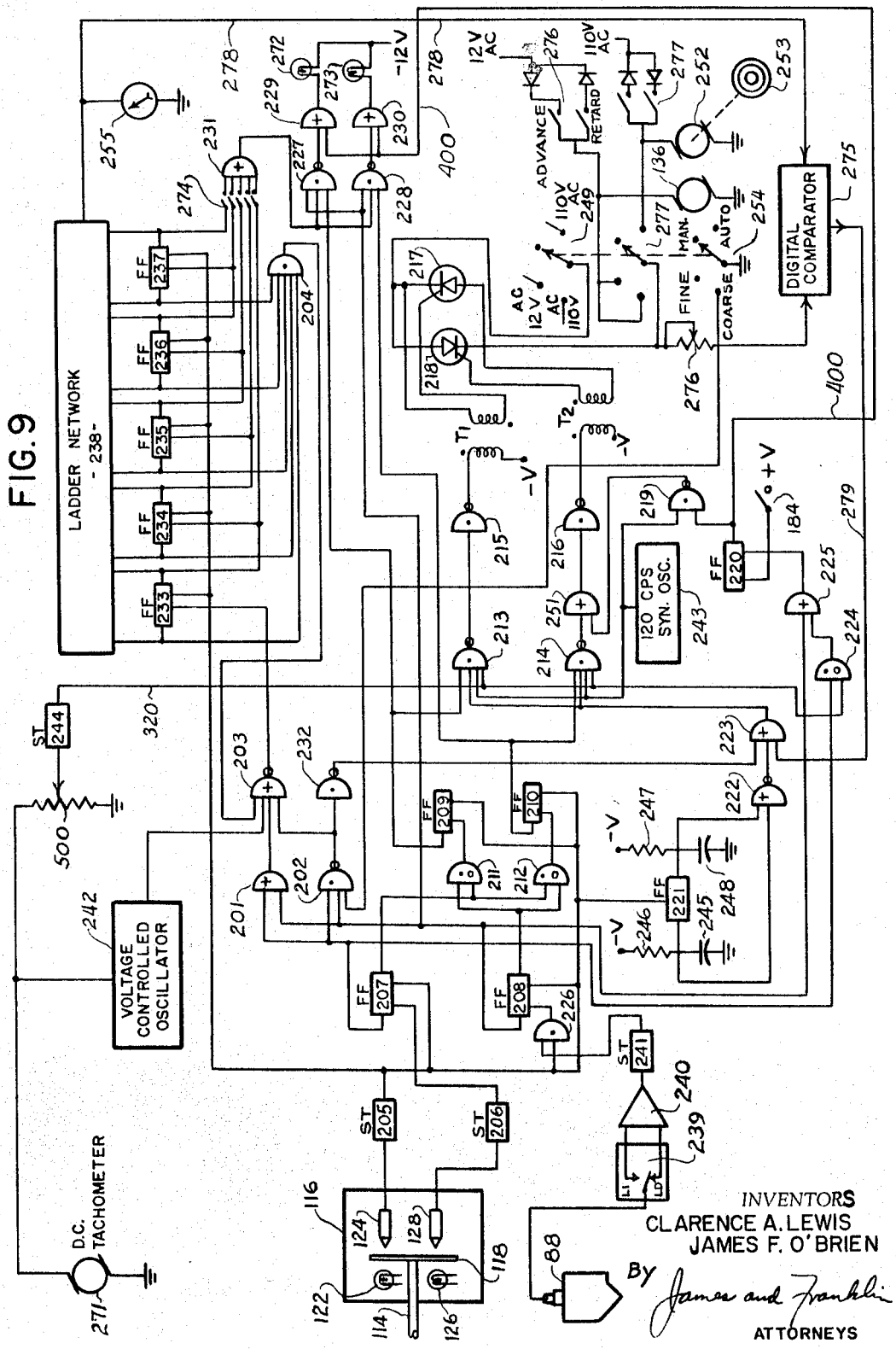

To accomplish the foregoing general objects, and other more specific objects which will hereinafter appear, our invention resides in the registration system, and the elements thereof, and their relation one to another, as are hereinafter more particularly described in the following specification. The specification is accompanied by drawings, in which:

FIG. 1 is a plan view of a multicolor rotogravure printing press line;
FIG. 2 is an elevation thereof;
FIG. 3 is an electrical diagram of the web scanner;
FIG. 4 is a simplified sectional view of the web scanner;
FIG. 5 is an electrical diagram of a phase micrometer forming a part of the system;
FIG. 6 is a simplifier sectional view through the phase micrometer;
FIG. 7 is explanatory of a detail of the phase micrometer;
FIG. 8 is a fragmentary front elevation of a control panel for the printing press line;
FIG. 9 is a block diagram for the system as applied to one color or unit of the printing press line; and
FIG. 10 is an electrical diagram for the digital comparator used in FIG. 9, with associated circuitry.

The present system maintains precise printing register on high-speed multicolor web printing and converting machines. It may be used also in any application where it is necessary to automatically synchronize a mechanical operation with a printing operation, such as cut-to-print control on a cutter creaser, whether in line or separated; cut-to-print control on a looper press; embosser-to-print control; etc.

Automatic register control is needed because of web variables and press variables. Variations in web characteristics such as moisture content, caliper, curl, and others, affect the "repeat length" established by the first printing station. Thereafter, in the press line itself, variations in dryer temperature, impression pressure, infeed tension, press room temperature and humidity, and so on, cause repeat length changes.

Each registration system has a web scanner, a so-called "phase micrometer" (or another web scanner could be used), a correction computer, and a correction station. In a typical installation of a multicolor printing press and an in line cutter, one registration ssytem is needed for each color unit except the first, and one for the cutter. The function of each system is to detect an off-register condition during each revolution of the printing cylinder, and to so control a correction motor as to restore the desired register in minimum time.

Referring now to FIGS. 1 and 2, we there show a multicolor rotogravure printing press line in which a web is drawn from roll 12 on a roll stand 14, by means of a pull unit 16 which may be conventional. The web is then led into rotogravure printing units each with its own dryer, indicated at 18, 20, 22 and 24. The web leaving the last unit is drawn through a pull unit 26, and may be rewound or led to a cutting press for sheet delivery.

In accordance with known practice the printing units are driven in synchronism by a main drive shaft 28 (FIG. 1) which is here shown driven by a motor 30. The same drive shaft may also drive the pull units 16 and 26. This establishes an approximate synchronism, but for perfect color-to-color register a slight additional or corrective motion is fed into one or another unit as required in response to electric eye scanning. For this purpose the drive from the main drive shaft 28 to each unit includes a so-called "running register" which includes differential gearing housed at 38, 40, 42 and 44. A small reversible correction motor may be used to add or subtract the correction needed, the correction motors being indicated at 48, 50, 52 and 54 respectively.

A suitable marker on the web, or a leading or trailing edge of the printed impression, is scanned by suitable scanning heads indicated in FIG. 2 at 60, 62 and 64. The pulse output from a scanner could be compared with another marker for another color on the web, but is here shown compared with the rotative position of the printing cylinder for the latter color. The pulse unit for this purpose is here referred to as a "phase micrometer," and is indicated in FIG. 1 at 70, 72 and 74. The rotating part of the phase micrometer is turned in unison with the printing cylinder.

The pulse outputs of the scanners and phase micrometers are led to a computer (not shown in FIGS. 2 and 3) from which power is supplied to the correction motors.

Web scanner

The web scanner is shown in FIGS. 3 and 4, and corresponds to any one of scanners 60, 62 and 64 in FIG. 2. It views the printed web as it passes over an idler roller in the case of paper or board webs, or over a background bar in the case of transparent materials. As the register mark passes beneath a beam of light that is directed on the web, a web scanner pulse is produced. This pulse is compared in time to a cylinder reference pulse generated in the phase micrometer. Scanner pulses may be produced from any printed pattern in line with the scanner. Thus any leading or trailing edge of a printed pattern laid down by the first color station may be used as a web reference.

The light source is lamp 80 and its filter 81 and lens system 82. Reflected light from the web passes through a lens system 84 to a light-sensitive cell 86. The scanner housing 88 may be precision machined with lapped joints, and the cover and body may be cast of heavy walled aluminum, in order to meet explosion-proof requirements, as when highly volatile inks are used. The scanner optics may include condensing lenses, special filters, and pre-set objective lenses. The optics are located centrally in the housing, and the housing is very small, permitting ease of scanning at either edge of the web, thus eliminating the need for a right or left hand web scanner. The web scanner amplifier and emitter-follower circuit preferably are transistorized and mounted on a small printed circuit board 90 which can be easily replaced, in the event of component failure.

The beam of light from lamp 80 is directed at an angle to the surface of the web so that light reflected by a glossy surface will not enter the objective lenses 84. The image of a register target that intercepts the beam of light is projected onto the sensitive area of the photodiode 86. This produces reliable pulses from any normally used printing contrast. A light increase (a light target on dark background), or a light decrease (a dark target on light background), may be used for holding register. It changes the current through the photodiode and results in a web signal pulse which is amplified by transistor Q1 (FIG. 3). The output is fed to an emitter-follower circuit consisting of transistor Q2 and resistor R7. Because of the low impedance of the emitter-follower, any practical length of cable may be used between the web scanner and the correction computer. The cable is detachably attached through a multiple prong connector indicated at 92 in FIGS. 3 and 4. Also included is a Zener diode 94 which provides a well filtered power supply to the photodiode 86, which raises signal-to-noise ratio and therefore improves sensitivity. The power supply is D.C. and comes in from connector 92 on wires 96 and 98. Power for lamp 80 also is D.C. and comes in on wires 100 and 102. The output pulse is generated between leads 104 and 98.

The phase micrometer

The phase micrometer is shown in FIGS. 5, 6 and 7, and corresponds to any of 70, 72, and 74 in FIG. 1. It is driven by the printing cylinder and has two functions. One is to produce a "live" gate signal which is used to select the proper register target. The other is to produce a micrometer pulse which acts as a mechanical reference pulse, in lieu of scanning the second color.

The phase micrometer housing 116 (FIG. 6) is located on a bracket 112 attached to the rear of the cylinder housing, and its shaft 114 is coupled to a shaft (not shown) at the end of the engraving cylinder (or a rotary cutter). Inside the housing 116 is a cup 118 carried by shaft 114. There is also a dual photoelectric assembly supported and rotatably adjustable on a disc 146 concentric with the cup. Electrical connections are brought in to disc 146 through a slip ring assembly shown at 120. Enclosure 116 preferably is explosion-proof.

There are two optical systems, one at 122, 124 producing a live gate signal, and the other at 126, 128 to produce a micrometer pulse. The cup 118 has an elongated slot 130 (FIG. 7) and a short slot 132 in its circumference. These are offset axially as shown in FIG. 6, so that light passing through each opening will fall on only one of the photodiodes 124 and 128. Thus there is only one gate signal and one micrometer pulse for each revolution of the cup 118.

A schematic diagram for the phase micrometer is shown in FIG. 5. When the elongated opening passes in front of lamp 122 increased current flows in photodiode 124, producing a rectangular gate referred to as the "live gate." When the short slot passes in front of lamp 126, the other photodiode 128 produces a pulse referred to as the "micrometer pulse." The load resistors for these circuits are in the remote computer. A cable of adequate length is readily provided, it being detachably connected by means of a connector 134, shown in FIG. 5 but not visible in FIG. 6, it being on one side of the housing 116.

A small D.C. phasing motor 136 in the phase micrometer is used to change the angular relationship of the phase micrometer to the printing cylinder. The motor has gear reduction at 138, and then drives a pinion 140 which meshes with a ring gear 142 secured to the hub 144 of the disc 146 which carries the lamps 122, 126 and the photodiodes 124, 128. These are diametrically opposed for mechanical convenience, but function as if located side-by-side axially. The "phase" setting may be changed from the control station, either manually by pushbuttons, or automatically, by means of motor 136.

The disc 146 may be made of insulating material. There are five slip rings secured to or printed on its back face, concentric with the shaft 114. These are engaged by five stationary brushes, indicated at 120 in FIG. 6, for the five connection wires shown in FIG. 5. The connector 134 (FIG. 5) has additional wires, not shown, for remote control of the motor 136 (FIG. 6). This motor may be a permanent field motor, in which case two control wires are enough, these being supplied with D.C. which is reversed in polarity to reverse the motor.

Digital correction computer

The digital correction computer is schematically shown in FIG. 9. It receives input signals from the web scanner 88 and from the phase micrometer 116 and computes the magnitude and direction of the register error. Electrical output signals are generated to drive a servo motor 252 at the proper speed and in the proper direction to eliminate the misregister. One feature of the present system is that the transistorized computers are so small that all of the computers may be and preferably are located at the master control station, where they are readily accessible. All that is needed at the printer is the scanner, the phase micrometer, and the correction motor. The computer and its operation are described in greater detail later.

Power supply

A common power supply that feeds all of the computers may be and preferably is located at the master control station. It may be conventional and is not shown in the diagram. In addition to the necessary computer and lamp voltages, the power supply contains a local oscillator which produces a pulse for approximately each 0.001 inch of web that passes beneath the web scanner, and contains a "go-down" circuit which inhibits all computers from operating in "automatic" until the press has reached a pre-set speed. This avoids unwanted corrections when starting or stopping the press. This feature is described in greater detail later.

The power supply provides D.C. for the electronic circuitry, and not for the correction motors. The latter are energized from the A.C. power supply through silicon controlled rectifiers in the individual computers. The common D.C. supply unit therefore may be small and inexpensive.

Master control station

The master control station has a front panel, some of which is shown in FIG. 8. The bracket 150 indicates how much panel is used for one printing press, in this case the second press; the bracket 152 is for the third printing press; and so on. The master control station provides either manual or automatic control of either register of phasing. Located on the front panel are meters 160, 162, 164 which indicate the magnitude of the register error for stations 20, 22 and 24 respectively. There are also correction-indicating lamp pairs 170, 172, 174, one lamp to show that an "advance" correction is being made, and the other to show that a "retard" correction is being made.

An important feature of the control station is the phasing controls which allow an initial setup of a new job to be made rapidly. A rotary switch 180 may be turned to any of four positions for coarse phasing, fine phasing, manual register, and automatic register. Either of pushbuttons 182 is used for manual phasing. Pushbutton 184 initiates the automatic phasing operation, which will be coarse or fine, depending on the position of switch 180. Either of pushbuttons 186 may be used for manual change of register with switch 180 on "manual." The register is automatic if switch 180 is on "auto."

Servo correction motor

The output of the digital computer feeds a servo motor 252 (FIG. 9) that is forced to run at a speed proportional to the register error. Motor 252 corresponds to any one of the correction motors shown in FIG. 1 at 50, 52 and 54. As the register error is reduced towards zero, the motor runs slower and slower until at zero error the motor is stopped. The motor makes the register correction through the running register drive mechanism as here shown, but could operate a compensator roll. The servo motor is capable of delivering full torque for the smallest error. In addition, it acts as a filter and does not introduce transients or sudden register variations in the printed web. The motor may be an ordinary D.C. motor, but is operated from an ordinary A.C. source through silicon-controlled rectifiers.

The motor may be a D.C. motor of any desired type. The field may be a permanent magnet field or it may be shunt wound or series wound and excited by D.C., the supply of which is no problem because only small power is needed for the field, and it need not be filtered. For small motors, as in the phase micrometer of FIG. 6, a permanent magnet field is preferred for simplicity.

Operation

The operation may be described as follows. The register mark printed by the first color being laid down is viewed by the web scanner 88 (FIG. 9) which transmits a pulse to the digital computer. The computer selects the register pulse from other pulses by means of the live gate from the phase micrometer 116. It also compares the selected register pulse with the micrometer pulse and determines the magnitude and direction of the error. This information is fed to the servo correction motor 252 via the master control, assumed to have its selector switch (180 in FIG. 8) in automatic. This switch is shown in FIG. 9 as a three pole switch marked 249, 277 and 254. Although shown as having three poles, additional poles, not shown, may be used for so interlocking the circuits as to prevent short circuits in the event of mismanagement of the various switches. There is a tachometer 271 which feeds a signal proportional to the press speed to the power supply in the master control in order to operate a voltage-controlled local oscillator 242, and also the "go-down" circuit marked 244, 500.

Three inputs are required for operation of the system. They are the web signal from scanner 88, the phase signal from photodiode 128, and the live gate signal from photodiode 124. The live gate signal initiates the computing cycle by resetting a counter composed of flip-flop circuits (FF) 233, 234, 235, 236, 237, and storage elements FF 207, 208, and either FF 209 or 210. The live gate signal also selects an active web area by enabling a web pulse to reach FF 208 through gate 226 only when the live gate signal is present. This feature allows the use of a register target with appropriate clearance, and the target can be both preceded and followed by other printed marks or patterns.

The web pulse is first conditioned through a switch 239 so that a negative going pulse is presented to the amplifier 240 for either a light increase or a light decrease contrast. Schmitt trigger (ST) circuits 205, 206, and 241 condition or sharpen their respective input signals so that a constant output pulse amplitude and rise time is always produced. Flip-flop circuits 207 and 208 produce a logic 1 output upon receiving the phase and web signals respectively. The outputs from FF 207 and 208 are maintained until the next live gate signal is received, whereupon the whole cycle is repeated. Gate 201 is an "or" gate, that is, an output is produced when any one input is present. Gate 202 is an "and" gate, that is, an output is produced only when all inputs are present.

The small circles on the output of some gates indicate that an inversion takes place, that is, the output signal is the opposite of the input signal. Gate 204 produces an output whenever the counter reaches its maximum count. This gate is necessary because otherwise the counter would improperly recycle to zero if a register error represented by a count greater than the maximum capability of the counter were to occur. A voltage-controlled oscillator 242 produces a variable frequency output so that one pulse is generated for approximately each 0.001 inch of web that moves past the web scanner, for any press speed.

The outputs from gates 201, 202, 204 and oscillator 242 are inputs to "or" gate 203. The output of this gate 203 represents the number of pulses from the voltage controlled oscillator that occur during the interval between the time that the first to occur of either the web signal or phase signal occurs, as indicated by its presence at "or" gate 201, and the time that the second occurs, as indicated by the preesnce of both signals at the "and" gate 202. In all cases the number of pulses cannot exceed the maximum capability of the counter. Thus, the total number of pulses stored in the counter represents the register error in theusandths of an inch. In the present case, with five flip-flop circuits or counter stages leading to the ladder network, the maximum stored error is 0.032 inch. Errors greater than 0.032 inch appear as 0.032 inch for correction purposes.

Gates 211 and 212 and flip-flop circuits 209 and 210 determine the direction of the register correction. Gate 211 produces an output pulse which actuates FF 209 only if the web signal occurs before the phase signal. Gate 212 in turn actuates FF 210 only if the phase signal occurs before the web signal. Thus, FF 209 or FF 210 produces an appropriate directional output for any register error.

The output of FF 209 combines at gate 213 with the output of a 120 c.p.s. (cycles per second) oscillator 243, which operates in synchronism with the regulator 60 c.p.s. power supply. It also combines with the output of the go-down Schmitt trigger circuit 244, and the output of gate 223. When all of these inputs occur, silicon-controlled rectifier 217 is pulsed through gate 215, so that the correction motor 252 starts to rotate in proper direction to reduce the register error to zero. The correction motor will accelerate to a speed proportional to the error voltage produced by the output of the ladder network 238. The ladder network receives binary digital information from the five-stage counter composed of flip-flops 233, 234, 235, 236 and 237. A voltage is then generated which is proportioned to the binary number stored in this counter.

The method of producing a register motor speed proportioned to a signal is disclosed in our copending patent application Serial No. 338,204 filed January 16, 1964, and entitled "Electrical Servo System." Briefly, the output rate feedback from the motor armature is compared to a control signal, and when the control signal is greater the motor is driven by substantially full-width half waves from an A.C. source and a silicon controlled rectifier, until the armature generates an output rate feedback which equals the control signal. This stops the supply of power half waves until the motor speed lessens and the control signal again is greater, whereupon the supply of power half waves is resumed.

In FIG. 9 the armature of motor 252 is energized from a conventional A.C. source indicated at 110 v. at switch 249 in "auto" position. This source is connected through either of two oppositely polarized silicon controlled rectifiers indicated at 217 and 218. A double synchronous pulse source 243 supplies A.C. pulses at double the frequency of the 110 v. source. This supplies a pulse for each half cycle of the A.C. power supply, the frequencies ordinarily being 60 and 120 cycles per second. A control signal or error signal is also supplied, for correction in one direction or the other.

There is also a comparator circuit 275 to which the armature is connected through a potentiometer 276 which varies the feedback rate, that is, the constant of proportionality between motor speed and the error. The motor armature acts as a generator during the non-energized half cycles and thereby provides an output rate feedback which is supplied through potentiometer 276 and rotary switch deck 277 to the comparator 275. The control signal from the ladder network 238 via conductor 278 is opposed in the comparator 275 by the feedback, to provide a logic error signal which is delivered through conductor 279. This is an on-off signal which is turned on when the error voltage exceeds the feedback voltage.

There is also means to determine the direction of the error signal, as previously described, and centering about gates 211, 212 and FF 209 and 210.

When the error signal exceeds the rate feedback, the logic signal from comparator 275, combined with the forward or reverse signal, causes a train of pulses to be applied to the gate lead of either silicon controlled rectifier 217 or 218, making one or the other conductive, and so energizing the D.C. motor 252 with a train of half waves. The direction of rotation depends on which rectifier is used. When the motor comes up to speed, so that the rate feedback equals or exceeds the error signal, the train of half waves is stopped. The motor then is deenergized and begins to slow down. If the error voltage again exceeds the feedback, there is another train of half waves, but ordinarily this is a train or "burst" of shorter duration. Only enough half waves arrive at the motor to keep it at desired speed.

The speed automatically reduces as the error decreases. This is so because the feedback voltage is compared with the error voltage, and when the error voltage is less, a smaller feedback voltage results in the desired equality at which the motor is deenergized. The smaller feedback voltage is delivered at a lower motor speed. Thus, the motor is turned in that direction which lessens the error signal, and at a rate dependent on the magnitude of the error signal.

In any event, the error voltage is reduced as the correction takes place, and the speed of the motor is reduced as the error decreases. For any given error the energization (the length of the "bursts") is reduced as the servo motor 252 comes up to speed for that error, and is maintained at a value which is just enough to maintain the desired speed for that magnitude of error. Because it is the substantially full-width half waves that are turned on and off, maximum motor torque is available for a small error.

For more detailed description reference is made to FIG. 10, which shows the digital comparator 275 (FIG. 9) and associated circuitry.

The motor armature 252, in the non-energized half cycles, is used as a generator to provide an output rate feed-back through potentiometer 276. A potential coming through either of diodes 288 and 290 on either line 292 or 294 is compared to the control signal coming through line 274, to provide a logic control signal which appears at conductor 296 whenever the feedback voltage is less than the error voltage.

Here again there is a synchronous double frequency pulse source which again may be a Schmitt trigger circuit and an amplifier, indicated by transistors Q11, Q12 and Q13, operating from A.C. source 190.

There is an "and" gate represented by transistors Q7 and Q8 which responds to a logic error signal through diode 298, and a forward signal from FF 209 through diode 300, and the double frequency from wire 192 through diode 302. There is a similar "and" gate represented by transistors Q9 and Q10 which receives a logic error signal from line 296 through diode 304, and the reverse signal from FF 210 through diode 306, and the double frequency pulses from wire 192 through diode 308. The output of the one "and" gate or the other is supplied through pulse transformer T1 or T2 to the gate leads of silicon controlled rectifiers 218 or 217. The arrangement is such that the D.C. motor is intermittently energized for varying intervals by half waves of A.C. of proper polarity to turn the motor in that direction required to lessen the error, and at a rate dependent on the magnitude of the error.

The comparator for comparing the error voltage appearing on line 274 with the rate feedback voltage appearing at potentiometer 276 from motor 252 comprises transistors Q14, Q15, Q16, and diodes 288 and 290, and resistors 312 and 314. If the rate feedback voltage from motor 252 is positive, a positive voltage appears through diode 290 and on line 294. This voltage is compared through resistor 314 with the negative error voltage appearing from line 274 through resistor 312. If the error voltage is greater then the output rate voltage, a negative voltage appears at transistor Q14, which turns transistor Q16 off, thereby activating diodes 298 and 304, and applying inputs through diodes 298 and 304 to the "and" gates. Transistors Q14 and Q15 constitute a high gain differential amplifier which turns Q16 off when the error voltage is greater than the output rate voltage, thus providing a desired logic control signal. If a negative output rate voltage from the motor 252 appears at potentiometer 276, a negative voltage appears through diode 288 and on line 292. The negative error voltage appears at resistor 312, and if it is greater than the output rate voltage, the transistor Q14 is turned on through transistor Q15, and transistor Q14 as before turns transistor Q16 off, thereby activating diodes 298 and 304 through line 296. The diodes 300 and 306 discriminate as to the direction of motor rotation.

The above takes place during normal "automatic" operation. If, however, either the web pulse or phase pulse does not occur for one reason or another, transistor Q18 (gate 232 in FIG. 9) is turned on and through diodes 304 and 298 inhibits motor operation. Also, if the live gate pulse fails to occur, Q17 (gate 222 in FIG. 9) is turned on and likewise inhibits motor operation. The motor is inhibited also by the go-down Schmitt trigger circuit 244 through line 320 (FIG. 10) and diodes 322 and 324. Thus, the motor is prevented from functioning if either the web pulse, phase pulse, or live gate pulse fails to occur.

It is also prevented from functioning until the press is at a speed represented by the setting of the go-down potentiometer 500 (FIG. 9). Schmitt trigger 244 requires a minimum voltage to turn on, and when the press speed is too low the tachometer 271 does not supply that voltage (as adjusted by potentiometer 500).

With reference to FIG. 9 instead of FIG. 10, if either the web or phase pulse does not occur, the servo motor 252 is prevented from operating because there will be no output from "and" gates 202 and 232, which in turn activate "or" gate 223 to inhibit both gates 213 and 214, these being the directional control gates.

If the live gate signal circuitry should fail, it would also activate the "or" gate 223 to inhibit both gates 213 and 214. This is accomplished as follows: The live gate signal pulses flip-flop 221 each repeat cycle. Assume resistor 246 is shorted to ground at the instant that FF 221 is pulsed, and that resistor 247 is opened from ground. Capacitor 248 will charge at a rate depending on the value of resistor 247 and capacitor 248. If another live gate pulse does not occur before the voltage reaches a predetermined value, the "or" gate 222 will be activated, and through gate 223 both gates 213 and 214 will be inhibited. The same reasoning can be used to show that gates 213 and 214 will be inhibited if resistor 247 were shorted and resistor 246 were opened from ground, to charge capacitor 245.

This circuit also provides press stability for very low press speeds when needed for some special purpose, because a correction is permitted for only the time interval represented by the resistor-capacitor values of 245, 246, 247 and 248.

The retard and advance indicator lights 272 and 273 are driven by "and" gates 227 and 228. There are three inputs necessary to operate either of the indicator lights: (1) The direction of the correction derived from FF 209 or FF 210; (2) The web signal derived from FF 208 (this condition provides a visual indication that a web pulse is being received); (3) The output derived from gate 231. Gate 231 is an "or" gate whose input can be selected by closing a combination of the five switches shown at 274, so that the lamps will operate only if the register error is greater than one-, two-, four-, eight-, or sixteen-thousandths of an inch, as selected. This is done by closing all switches above the value selected, e.g. for flashing at an error of 0.004 inch or more, the switches connected to FF 235, 236 and 237 are closed. This selection is provided because usually the lamp is not used for small errors, and is used only for larger errors, in order not to unnecessarily perturb the operator. Permanent connections may be provided instead of switches.

*Automatic and manual phasing*

A phasing procedure is necessary for initially aligning the proper web target with the phase micrometer reference pulse. Initial phasing can be accomplished while the press is either running or at standstill.

In FIG. 6 it will be recalled that the phase micrometer has a small permanent magnet D.C. motor 136 which, when energized, rotates the optical systems with respect to the fixed housing 116. Since the slotted cup 118 turns with the printing cylinder, rotation of the light sources effectively changes the position of the live gate and phase micrometer pulse with respect to the printing cylinder.

To phase while the press is at standstill, the proper web target is first "jogged" under the web scanner, that is, the web is inched in small increments by manual control of the main drive motor until the target is seen by the scanner. The automatic phase switch 184 is then depressed with the rotary switch 249 in the "Coarse Phase" or left-hand position. Switch 249 has three poles all turned in unison, as indicated by the broken-line connection. (This switch is indicated in FIG. 8 at 180.)

Flip-flop 220 is set when the automatic phase switch 184 is depressed. The output of FF 220 combines with the 120 cycle synchronous circuit 243 through "and" gate 219. The output of gate 219 through gates 251 and 216 pulses SCR (silicon controlled rectifier) 218, the output of which drives the D.C. motor 136 located inside the phase micrometer. Motor 136 rotates the light sources until the phase micrometer pulse slot 132 is brought into alignment with the phase micrometer signal light source 126. When this occurs, flip-flop 207, which has been reset by the leading edge of the live gate signal, is now set by the phase micrometer signal. The output of FF 207 through gates 204 and 225 sets FF 220, thereby deenergizing the phase micrometer motor 136 because the silicon-controlled rectifier 218 is no longer pulsed from 120 c.p.s. source 243.

For phasing while the press is running, the same phasing procedure is followed except that now the go-down signal from Schmitt trigger 244 inhibits gate 224, thus preventing the phase signal from setting FF 220. However, the first web pulse that occurs in the live gate area through FF 208 and gate 225 sets FF 200, thereby stopping the phase micrometer motor 136 as explained above.

Both coarse phasing procedures explained so far (standstill or running) are designed only to bring the selected web and phase micrometer signals within the live gate area in the shortest possible time. With switch 249 in the coarse phasing position (the left contact marked 110 v.), the computer is prevented from driving the phase micrometer motor to a true null position (as it does when reducing the register error to zero under "automatic" operation). This is so because switch 254 prevents "and" gate 202 from operating, which in turn prevents either SCR 217 or 218 from being pulsed through "and" gates 213 and 214.

When switch 249 is placed in the "fine phase" position, marked "12 v.," the computer calculates the error, and the output from either SCR 217 or 218 drives the phase micrometer motor 136 toward a null. However, the motor now runs at a much lower speed than when switch 249 is in "coarse phase" because a greatly reduced voltage, say twelve volts, is supplied to SCR 217 and 218, instead of the full 110 volts. This is desirable because with 110 volts the phase micrometer motor would oscillate or hunt about the null position. When the phase micrometer "nulls out," as indicated on meter 255 by a reading of zero error, selector switch 249 is manually placed in the "auto" register position, and register then is maintained as previously described.

For the duration of coarse initial phasing, both indicator lights 272 and 273 will be on simultaneously. This is accomplished through gates 229 and 230 which are connected to FF 220 through line 400. FF 220 is activated when pushbutton switch 184 is pressed to initiate automatic phasing. When the lights extinguish that indicates to the operator that coarse phasing has been completed.

Pushbutton switches 276 may be used to control phase motor 136, one button for advance and the other for retard, when in "automatic." The third contact of the selector switch is for manual control, and in this position the pushbutton switches 277 may be used to control the correction motor 252, one button for advance and the other for retard.

*The mechanical filter action*

The mechanical smoothing and filtering aspect of the controller may be explained as follows: In this control system the error information is received at discrete intervals. It is discontinuous because no information is received between target intervals. If corrections are made based on the magnitude of each error, without smoothing or filtering, the output corrections are discontinuous, abrupt, and introduce transients to the correction mechanism.

Practical systems have heretofore been hydraulic, and in such systems there is high torque with little inertia. An electric motor has high inertia and therefore would inherently possess a smoothing and filtering effect if operated as a linear servo motor, but that was not heretofore feasible. An electric motor system, if used, would be operated on and off, and in such case no advantage could be taken of the inertia of the armature, which in fact was a disadvantage because of overshooting and hunting. Hydraulic systems have been preferred because of the ability to secure a linear servo response, that is, a correction speed proportional to error. However, this speed is attained almost instantaneously upon receiving the error signal, because of the low inertia.

In the present system, an electric motor is employed, and the supply circuitry is such that the motor is operated in true linear servo fashion, with a correction speed proportional to error. Thus, the main advantage of a hydraulic system is obtained, while eliminating the need for hydraulic lines etc., and there is the additional advantage here under discussion, namely, a smoothing and filtering action. The motor acts as a low-pass filter passing extremely low frequencies but filtering higher frequencies that are in the order of magnitude of the repeat cycle on the web. This reduces the spurious corrections which otherwise would result from random errors.

It is therefore possible to correct for out-of-register trends the magnitude of which is less than the magnitude of the random errors. For example, a defective printed edge of the printed pattern may look to the system like maximum error, but if followed by normal patterns, the present system would minimize the response to this pseudo error because the error would be a random error.

Because the target information comes in discrete intervals, it is somewhat like an intermittent square wave, and contains harmonics or high frequencies. These high frequencies are filtered by the motor armature inertia, which instead produces a smooth correction with no abrupt changes.

The amount of inertia is dictated by the particular application. It is desired that the motor possess a time constant which preferably is greater than the time represented by each repeat cycle of the press. In some cases, a larger motor than might otherwise be needed might be employed for increased inertia. Alternatively, a flywheel may be added to the motor to increase the inertia of the armature itself. This is suggested in FIG. 9 by the addition of a flywheel 253 to the shaft of motor 252.

For purposes of making a quantitative comparison between this register control and an on-off hydraulic register control, the following simplified conditions may be assumed as an example.

(1) The gains are equal, i.e., a constant error will eventually produce a correction per repeat cycle equal to the constant error.

(2) The total correction is completely absorbed by the web before the next error computation cycle.

(3) A press speed of three repeat lengths per second (an average web speed).

(4) The time constant of the servo motor is equal to 0.33 seconds (say a quarter horsepower motor). This is the time required for the motor to reach 66% of the speed represented by the magnitude of the error.

(5) The time constant for the hydraulic controller is negligible compared to 0.33 second (typical of hydraulic).

(6) Random errors of ±0.005 inch are present, that is, the average register may be perfect and yet the computer may indicate a random error of ±0.005 inch.

The present improved register control upon receiving a +0.005 inch register error will start to accelerate the correction motor to a speed which represents 0.005 inch of correction per repeat cycle. However, because of the time constant the average speed is equal to $$\frac{(½) (0.66) (0.005 \text{ inch})}{0.33 \text{ second}}$$

which equals $$\frac{0.0015 \text{ inch}}{0.33 \text{ second}}$$

The ½ represents the average from zero to maximum speed; the motor reaches a speed of 0.66 of the maximum because of its time constant; and the repeat cycle time is 0.33 second. This is an average speed. Thus, the total correction introduced in one repeat length is equal to this average rate times 0.33 second or 0.0015 inch. Then, every time a random error is introduced, the register will be spuriously corrected by 0.0015 inch/0.005 inch of random error. If the motor time constant is doubled, the register error will be falsely corrected by only 0.00075 inch/0.005 inch of random error.

A standard ¼ H.P. motor has a time constant of about 0.3 second, which is sufficient for most applications, both in respect to power and inertia.

The hydraulic register control accelerates to speed in negligible time, and so a 0.005 inch random error would spuriously change the register by 0.005 inch for such a control system. The present system is therefore not only simpler in avoiding the need for hydraulics, but also is far better. It will correct an out-of-register condition whose magnitude is less than the randomly superimposed errors. Thus the present apparatus will correct a regularly repeated error of 0.001 inch while minimizing response to a random error even if greater, say 0.005 inch in the above supposed example.

Advantages

It is believed that the construction and operation of our improved registration system, as well as the advantages thereof, will be apparent from the foregoing detailed description. The system retains the advantages of accuracy and stability of binary digital counting for the measurement of the error, but avoids the disadvantages of such a system in respect to hunting and instability when correcting the measured error. Stated conversely, our system retains the advantage of an analog system in respect to error correction, while avoiding the limited accuracy and the circuitry "drift" and consequent changes of measurement when using an analog system.

The apparatus is well adapted to the use of small solid-state semiconductor components, resulting in compact units with readily replaceable modules. The accuracy is unaffected by electrical drift, warmup time, aging of components, or power supply variation. Only a small web scanner and a small phase micrometer are needed at the printing station, all other circuitry being localized at the control panel, and no special circuitry box or panel being needed at the individual printing stations.

The rate of correction is proportional to the magnitude of the error, and approaches zero as the error approaches zero, thereby avoiding hunting. Automatic correction is eliminated when the press speed is below a minimum speed for stability. The use of a live gate selects a true target from other pseudo targets on the web. Phasing of the phase micrometer when starting a new web is readily accomplished. A preliminary high-speed rough phasing may be accomplished with the press either at standstill or operating, and may be immediately followed by fine phasing, all performed under remote control from a single control panel.

The correction part of the system acts as a mechanical filter to eliminate or minimize response to random error. It acts as a filter which prevents transients from reaching the web and succeeding color stations, and it also filters the random errors so as to minimize the effect of false register errors. It does not have any "deadband" and is actuated for an error of 0.001 inch in the example shown, and could respond to a smaller error if desired.

Downtime and loss of production is greatly reduced from that encountered when limited life components such as vacuum tubes or relays are utilized in the control. Because of the long life characteristic of solid-state components, there is no need for a preventative maintenance program, nor for the stocking of relays, vacuum tubes, etc.

The register control is completely electrical, and therefore the high cost of hydraulic components and installation is avoided. All of the electronics are located in one master control station, thereby requiring a minimum of wiring.

It will be understood that while we have shown and described our invention in a preferred form, changes may be made without departing from the scope of the invention as sought to be defined in the following claims. In the claims, the reference to binary counting methods or binary means is not intended to exclude any counter using bi-stable storage elements, e.g., flip-flop circuits, even if combined to use a higher base than two, as in a decade counter. The reference to armature inertia is not intended to exclude the intentional loading of the armature shaft to increase the inertia.

We claim:

1. Apparatus for correcting errors in the registration of multiple repeat operations on a moving web, said apparatus comprising an oscillator for generating pulses corresponding to a desired minimum unit of error, scanners for scanning targets representing the multiple operations, binary means for digitally counting the number of pulses between targets as an accurate measure of the magnitude of the error to be corrected, means for deriving an error voltage proportional to the number of pulses representing the error, a variable speed correction motor, a comparator circuit, the said motor armature being used as a generator to provide an output rate feedback, the error voltage and the output rate feedback being opposed in said comparator circuit to provide a logic error signal, and means responsive to the logic error signal for driving the correction motor at a rate substantially proportional to the magnitude of the error voltage regardless of variations in load, in order to reduce the error.

2. Apparatus for correcting errors in the registration of multiple repeat operations on a moving web, said apparatus comprising an oscillator for generating pulses corresponding to a desired minimum unit of error, scanners for scanning targets representing the multiple operations, electronic circuitry including flip-flop binary circuits and gate circuits for digitally counting the number of pulses between targets as an accurate measure of the magnitude of the error to be corrected, digital to analog converter means for deriving an error voltage proportional to the number of pulses representing the error, a variable speed correction motor, said correction motor being a D.C. servo motor, and said means for driving the same including an A.C. power source connected through rectifier means to supply alternate half cycles to the armature of the motor, a comparator circuit, the said motor armature being used as a generator during the idle half cycles to provide an output rate feedback, the error voltage and the output rate feedback being opposed in said comparator circuit to provide a logic error signal, and means responsive to the logic error signal for driving the motor at a rate substantially proportional to the magnitude of the error voltage regardless of variations in load, in order to reduce the error.

3. Apparatus for correcting errors in the registration of multiple repeat operations on a moving web, said apparatus comprising an oscillator for generating pulses corresponding to a desired minimum unit of error, e.g., thousandths of an inch, scanners for scanning targets representing the multiple operations, electronics circuitry including flip-flop binary circuits and gate circuits for digitally counting the number of pulses between targets as an accurate measure of the magnitude of the error to be corrected, means including flip-flop circuits and a ladder network for deriving an error voltage proportional to the number of pulses representing the error, a variable speed correction motor, said correction motor being a D.C. servo motor, and said means for driving the same including an A.C. power source connected through either of two oppositely polarized silicon controlled rectifiers to the armature of the motor, a synchronous pulse source, a comparator circuit, the said motor armature being used as a generator during idle half cycles to provide an output rate feedback, the error voltage and the output rate feedback being opposed in said comparator circuit to provide a logic error signal, and means responsive to the logic error signal to intermittently, and for varying intervals, supply pulses from the synchronous pulse source to the gate lead of one silicon controlled rectifier or the other in order to supply substantially full width half waves from the A.C. power source to the motor for driving the same at a rate substantially proportional to the magnitude of the error voltage regardless of variations in load, in order to reduce the error, the said rate approaching zero as the error approaches zero.

4. Apparatus as defined in claim 1, including means for sensing the direction of the error, and means for driving the motor in one direction or the other depending on the direction of the error.

5. Apparatus as defined in claim 1, in which the digitally counted pulses are generated by a voltage-controlled oscillator, and in which the voltage controlling the oscillator is supplied by a tachometer driven by the apparatus moving the web, whereby the pulse rate is so changed when the web speed is changed that each pulse represents an approximately constant unit of error.

6. Apparatus as defined in claim 1, having additional go-down means connected to the web moving apparatus and responsive to the speed of the web and also connected to the registration correction apparatus to prevent operation of the registration correction apparatus when the web speed is lower than a desired predetermined minimum amount.

7. Apparatus as defined in claim 1, having means to generate a live gate pulse, and means to so combine the web scanner pulse with the live gate pulse as to select a desired web target from other spurious targets on the web in line with the true target.

8. Apparatus as defined in claim 1, in which the output rate feedback circuitry associated with the correction motor includes voltage varying means in order to vary the proportionality factor of the motor speed relative to the error without losing the desired independence of variations of load.

9. Apparatus as defined in claim 3, in which the digitally counted pulses are generated by a voltage-controlled oscillator, and in which the voltage controlling the oscillator is supplied by a tachometer driven by the apparatus moving the web, whereby the pulse rate is so changed when the web speed is changed that each pulse represents an approximately constant unit of error.

10. Apparatus as defined in claim 3, having additional go-down means connected to the web moving apparatus and responsive to the speed of the web and also connected to the registration correction apparatus to prevent operation of the registration correction apparatus when the web speed is lower than a desired predetermined minimum amount.

11. Apparatus as defined in claim 3, in which the output rate feedback circuitry associated with the correction motor includes voltage varying means in order to vary the proportionality factor of the motor speed relative to the error without losing the desired independence of variations of load.

12. Apparatus as defined in claim 1, in which the correction motor is an electrically operated servo motor having a speed of correction which is approximately proportional to the error, and the armature of which has sufficient inertia to provide a desired smoothing and filtering effect, with a filter action the time constant of which is greater than the repetitive rate that the target is viewed by the scanner, whereby the motor responds to an error trend but not to random errors even if large.

13. Apparatus as defined in claim 3, in which the correction motor is an electrically operated servo motor having a speed of correction which is approximately proportional to the error, and the armature of which has sufficient inertia to provide a desired smoothing and filtering effect, with a filter action the time constant of which is greater than the repetitive rate that the target is viewed by the scanner, whereby the motor responds to an error trend but not to random errors even if large.

14. Apparatus for correcting errors in the registration of multiple repeat operations on a moving web, said apparatus comprising scanning means for scanning a repetitive target on said moving web, and an electrically operated reversible correction motor and circuitry to energize the same, said motor being a servo motor having a speed of correction which is proportional to the error, and the armature of which has sufficient inertia to provide a desired smoothing and filtering effect, with a filter action the time constant of which is greater than the repetitive rate that the target is viewed by the scanner, whereby the motor responds to an error trend but not to random errors even if large.

15. Apparatus for correcting errors in the registration of multiple repeat operations on a moving web, said apparatus comprising scanning means for scanning a repetitive target on said moving web, and a reversible correction motor and means to energize the same, said motor being a servo motor having a speed of correction which is proportional to the error, and having sufficient inertia to provide a desired smoothing and filtering effect, with a filter action the time constant of which is greater than the repetitive rate that the target is viewed by the scanner, whereby the motor responds to an error trend but not to random errors even if large.

16. Apparatus as defined in claim 1, in which there is an indicating lamp, a voltage source to energize the lamp, and permanent connections to one or more of the binary stages in the counter, said connections including gates which serve to energize the lamp from the voltage source when the error is above a predetermined selected value of error.

17. Apparatus as defined in claim 3, in which there is an indicating lamp, a voltage source to energize the lamp, and permanent connections to one or more of the binary stages in the counter, said connections including gates which serve to energize the lamp from the voltage source when the error is above a predetermined selected value of error.

References Cited by the Examiner

UNITED STATES PATENTS

| | | | |
|---|---|---|---|
| 3,003,096 | 10/1961 | Du Bois | 318—20.290 |
| 3,068,787 | 12/1962 | Dall'Oglio et al. | 101—181 |
| 3,108,212 | 10/1963 | Nearhoof | 318—20.290 |
| 3,120,181 | 2/1964 | Thiede | 101—181 |
| 3,152,542 | 10/1964 | Chambon | 101—181 |

FOREIGN PATENTS 958,709 (No date) Great Britain.

EUGENE R. CAPOZIO, *Primary Examiner.*